(12) United States Patent
Kashima

(10) Patent No.: US 9,164,303 B2
(45) Date of Patent: Oct. 20, 2015

(54) DISPLAY DEVICE

(71) Applicant: BOE TECHNOLOGY GROUP CO., LTD., Beijing (CN)

(72) Inventor: Miki Kashima, Beijing (CN)

(73) Assignee: BOE TECHNOLOGY GROUP CO., LTD., Beijing (CN)

(*) Notice: Subject to any disclaimer, the term of this patent is extended or adjusted under 35 U.S.C. 154(b) by 73 days.

(21) Appl. No.: 14/234,850

(22) PCT Filed: Mar. 29, 2013

(86) PCT No.: PCT/CN2013/073505
§ 371 (c)(1),
(2) Date: Jan. 24, 2014

(87) PCT Pub. No.: WO2014/127558
PCT Pub. Date: Aug. 28, 2014

(65) Prior Publication Data
US 2014/0293179 A1    Oct. 2, 2014

(30) Foreign Application Priority Data

Feb. 19, 2013    (CN) .......................... 2013 1 0053603

(51) Int. Cl.
*G02F 1/133*    (2006.01)
(52) U.S. Cl.
CPC ............ *G02F 1/13306* (2013.01); *G02F 1/133* (2013.01)
(58) Field of Classification Search
CPC ............ G02F 1/133348; G02F 1/0333; G02F 1/13334; G02F 1/1393; G02F 1/13306; G02F 1/1392; G02F 1/1334; G02F 1/134309; G09G 3/3648; G09G 3/2011
USPC .................................................. 349/33, 31, 36
See application file for complete search history.

(56) References Cited

U.S. PATENT DOCUMENTS

2004/0017529 A1* 1/2004 Choi et al. ................... 349/114

FOREIGN PATENT DOCUMENTS

| CN | 102411225 A | 4/2012 |
| CN | 102707473 A | 10/2012 |
| KR | 20120106432 A | 9/2012 |

OTHER PUBLICATIONS

First Chinese Office Action dated Dec. 22, 2014; Appln. No. 201310053603.3.
Written Opinion of the International Searching Authority dated Nov. 15, 2013; PCT/CN2013/073505.

* cited by examiner

*Primary Examiner* — Mike Qi
(74) *Attorney, Agent, or Firm* — Ladas & Parry LLP

(57) ABSTRACT

There is provided a display device including a display panel and a background panel which are arranged opposite to each other, and a light source which is disposed on a side surface of the background panel. The background panel is in a transmissive state where no voltage is applied thereto, is in a light-scattering state where a direct-current (DC) voltage is applied thereto, and is in a transflective state where a high-frequency alternating-current (AC) voltage is applied thereto.

19 Claims, 1 Drawing Sheet

DISPLAY DEVICE

TECHNICAL FIELD

The embodiment of the present invention relates to a display device.

BACKGROUND

Liquid crystal displays (LCDs) have dominated the current flat-panel display market due to the characteristics of small size, low power consumption, non-radiation and the like. In an LCD, as liquid crystal does not emit light by itself and only adjusts and controls transmissive light, images can only be displayed when an LCD panel (also referred to as LCD screen) is equipped with light sources (e.g., backlights, front lights or external light sources).

With the rapid development of the LCD technologies, a transparent LCD is proposed. A transparent LCD utilizes ambient light (including natural light and light emitted by external light sources) and light emitted by a transparent backlight to display images on an LCD panel. The LCD generally employs side-lit backlights and comprises light sources, a light guide plate and an optical film assemble. When the ambient light is strong, the transparent LCD mainly employs the ambient light as the light source; and when the ambient light is weak, the transparent LCD mainly employs the transparent backlight as the light source.

Currently, the transparent LCD has been applied in a kind of refrigerator and used as a "window" of the refrigerator, namely a refrigerator window, through which users can see food stored therein without opening the refrigerator. Moreover, a series of user-friendly features can be also developed for different user groups, for example, the display of shelf life and nutrient content of stored foods, weather forecast, and notes left to family members, and even playing of movie. However, as the power of the light sources in the traditional transparent LCD is great, relatively great heat can be irradiate, and hence the storage of refrigerated/frozen foods therein can be affected when the transparent LCD is applied to the refrigerator.

SUMMARY

The embodiments of the present invention overcomes the defects in the prior art and provides a display device with low power for light sources.

In one aspect, the present invention provides a display device, which comprise a display panel and a background panel which are arranged opposite to each other, and a light source which is disposed on a side surface of the background panel, wherein the background panel is in a transmissive state where no voltage is applied thereto, is in a light-scattering state where a direct-current (DC) voltage is applied thereto, and is in a transflective state where a high-frequency alternating-current (AC) voltage is applied thereto.

For instance, transmittance of the background panel is different where different DC voltages are applied to the background panel.

For instance, transmittance of the background panel is lower where the DC voltage applied to the background panel is higher.

For instance, the background panel includes: a first substrate and a second substrate arranged opposite to each other, a cholesteric liquid crystal (CLC) layer disposed between the first substrate and the second substrate, a first electrode disposed between the first substrate and the CLC layer, and a second electrode disposed between the second substrate and the CLC layer.

For instance, the CLC layer may employ a negative liquid crystal layer comprising chiral ionic liquid.

For instance, the display panel may be of a normally white (NW) mode.

For instance, the display panel may be an LCD panel.

For instance, the display device may further comprise an air layer disposed between the display panel and the background panel.

For instance, the light source may be a light-emitting diode (LED) or an electroluminescent (EL) sheet.

As the display device of the embodiment of the present invention comprises a display panel and a background panel, the display device may have four states, namely a transparent state, a display state with a transparent background, a white state (i.e., the light-scattering state), and a display state with a white background. Moreover, the four states can be switched according to actual requirements, and hence the user experience can be good.

BRIEF DESCRIPTION OF THE DRAWINGS

Simple description will be given below to the accompanying drawings of the embodiments to provide a more clear understanding of the technical proposals of the embodiments of the present invention. It will be obvious to those skilled in the art that the drawings described below only involve some embodiments of the present invention but are not intended to limit the present invention.

Figure 1:
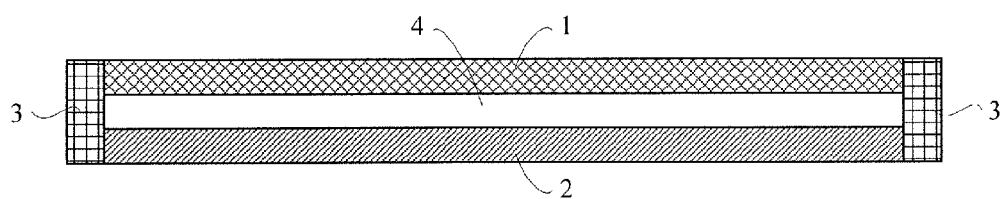
FIG. 1 is a schematic structural view of a display device in embodiment 3 of the present invention.

Reference numerals: 1—LCD panel; 2—background panel; 3—light source; 4—air layer; 21—first substrate; 22—first electrode; 23—CLC layer; 24—second electrode; 25—second substrate.

DETAILED DESCRIPTION

For more clear understanding of the objectives, technical proposals and advantages of the embodiments of the present invention, clear and complete description will be given below to the technical proposals of the embodiments of the present invention with reference to the accompanying drawings of the embodiments of the present invention. It will be obvious to those skilled in the art that the preferred embodiments are only partial embodiments of the present invention but not all the embodiments. All the other embodiments obtained by those skilled in the art without creative efforts on the basis of the embodiments of the present invention illustrated shall fall within the scope of protection of the present invention.

Unless otherwise specified, the technical or scientific terms used herein have normal meanings understood by those skilled in the art. The words "first", "second" and the like used in the description and the claims of the patent application of the present invention do not indicate the sequence, the number or the importance but are only used for distinguishing different components. Similarly, the words "a", "an" and the like also do not indicate the number but only indicate at least one. The word "comprise", "include" or the like only indicates that an element or a component before the word contains elements or components listed after the word and equivalents thereof, not excluding other elements or components. The words "connection", "connected" and the like are not limited to physical or mechanical connection but may include electrical connection, either directly or indirectly. The words "on", "under", "left", "right" and the like only indicate the relative position relationship which is correspondingly changed when the absolute position of a described object is changed.

Embodiment 1

The embodiment provides a display device, which comprises: a display panel and a background panel which are arranged opposite to each other, and a light source which is disposed on a side surface of the background panel; the background panel is in a transmissive state when no voltage is applied thereto, is in a light-scattering state when a DC voltage is applied thereto, and is in a transflective state when a high-frequency AC voltage is applied thereto.

The display panel may be an LCD panel, an electronic paper sheet, an organic light-emitting diode (OLED) panel or any other product or component with display function.

For instance, the light source is disposed on the outside of at least one side surface of the background panel.

Based on different states of the background panel, the display device of the embodiment may be in any of four states, namely a transparent state, a display state with a transparent background, a white state (i.e., a light-scattering state), and a display state with a white background. Moreover, the four states may be switched according to actual requirements.

Embodiment 2

The embodiment provides a display device, which comprises: a display panel and a background panel which are arranged opposite to each other, and a light source which is disposed on a side surface of the background panel. In the embodiment, the display panel is an LCD panel. For instance, the LCD panel may be a traditional twisted nematic (TN) type LCD panel, a traditional advanced super dimension switch (ADS) type LCD panel, or an LCD panel of another type.

For instance, the ADS mode is a kind of important horizontal electric field wide viewing angle technologies used for LCDs. The key features of the technology are described as follows: multidimensional electric fields are produced with electric fields generated on edges of slit electrodes on a same plane and electric fields generated between a slit electrode layer and a plate electrode layer on different layers, so that liquid crystal molecules of all alignment between the slit electrodes and over the electrodes in a liquid crystal cell can be rotated, and hence working efficiency of liquid crystals can be improved and light transmittance can be increased. Moreover, the ADS type switching technology can improve the image quality of thin-film transistor liquid crystal display (TFT-LCD) products and has the advantages of high resolution, high transmittance, low power consumption, wide viewing angle, high aperture ratio, low chromatic aberration, non push Mura and the like. The improvements of the ADS technology includes high-transmittance I-ADS technology, high-aperture-ratio H-ADS technology, high-resolution S-ADS technology and the like based on different applications. Both the structure and the material of the LCD panel can be prepared according to the prior art and will not be further described herein.

In the embodiment, the display device can be controlled to be in different states by the application of a voltage or no voltage to the background panel and the cooperation of the background panel, the light sources and the LCD panel. For instance, the display device is in the transmissive state when no voltage is applied to the background panel and is in the transparent state and the LCD panel is in the transparent state as well.

A high-frequency AC voltage (e.g., 100 kHz) is applied to the background panel to make it changed to a half-mirror state, that is, the transflective state, the background panel cooperates with the light source and the LCD panel to make the LCD panel display images, that is, the light emitted by the light source is reflected by a mirror of the background panel and enters the LCD panel to make the LCD panel display images, and in this case the display device is in the display state with a transparent background. When ambient light is strong, the power of the light sources can be lowered so that the ambient light can be utilized sufficiently. It can be seen that: as the background panel is in the transflective state when the high-frequency AC voltage is applied thereto, the light emitted to the background panel by the light source is reflected to the LCD panel with low loss, and hence the background panel not only has the function of a light guide plate but also achieves better effect compared with the light guide plate when the high-frequency AC voltage is applied thereto.

A DC voltage is applied to the background panel, and the background panel is in the light-scattering state (i.e., the white state); and when the LCD panel is in the transparent state, the display device is in the white state.

A DC voltage (e.g., 40v) is applied to the background panel, and the background panel is in the light-scattering state (i.e., in the white state). The background panel cooperates with the light source and the LCD panel to make the LCD panel display images, that is, the light emitted by the light source is scattered by the background panel and enters the LCD panel to make the LCD panel display images, and hence the display device is in the display state with a white background. It can be seen that: as the background panel is in the light-scattering state when the DC voltage is applied thereto, the light emitted to the background by the light sources is scattered and enters the LCD panel, and hence the background panel can also have the function of the light guide plate when the DC voltage is applied thereto, but the light utilization efficiency of the background panel in this state is lower than the light utilization efficiency when the background panel is in the transflective state. However, as the background is in the white state, the display effect of the display device is better than the display effect when the background is in the transparent state.

Other structures and functions of the embodiment are the same with those of the embodiment 1 and will not be further described herein.

Embodiment 3

As illustrated in FIG. 1, the embodiment provides a display device, which comprises: an LCD panel 1 and a background panel 2 which are arranged opposite to each other, an air layer 4 which is disposed between the LCD panel 1 and the background panel 2, and light sources 3 which are disposed on peripheral side surfaces of the background panel 2.

Figure 2:
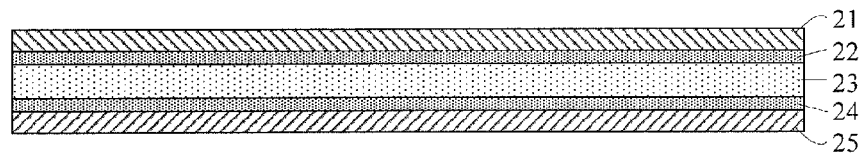
FIG. 2 is a schematic structural view of a background panel in FIG. 1.

As illustrated in FIG. 2, the background panel 2 includes a first substrate 21 and a second substrate 25 which are arranged opposite to each other, a cholesteric liquid crystal (CLC) layer 23 which is disposed between the first substrate 21 and the second substrate 25, a first electrode 22 which is disposed between the first substrate 21 and the CLC layer 23, and a second electrode 24 which is disposed between the second substrate 25 and the CLC layer 23.

For instance, the first substrate 21, the first electrode 22, the CLC layer 23, the second electrode 24 and the second substrate 25 are parallel to each other and have the same cross-sectional dimensions.

For instance, the first substrate 21 and the second substrate 25 employ transparent alkali-free glass substrates or quartz substrates. The first electrode 22 and the second electrode 24 are made of transparent metal oxide materials, preferably, indium tin oxide (ITO) films or indium zinc oxide (IZO) films.

The CLC layer 23 employs a negative liquid crystal layer comprising chiral ionic liquid. The chiral ionic liquid may be imidazolium chiral ionic liquid, quaternary ammonium chiral ionic liquid, oxazolinium chiral ionic liquid, thiazolinium chiral ionic liquid, pyridinium chiral ionic liquid or the like.

CLC is a milky-white viscous liquid and has a layered molecular structure, in which molecules are arranged in layers and overlapped layer by layer, the major axes of molecules in each layer are parallel to each other and parallel to the level of the layer, the direction of the major axes of molecules in different layers rotates to the right or the left by an angle in sequence layer by layer, and the molecular orientations among various layers are gradually varied and form a spatial warping spiral line, so that the CLC can be arranged to form a spiral structure as a whole. The embodiment of the present invention may employ conventional CLCs in the related technical field.

When no voltage is applied to the first electrode 22 and the second electrode 24 disposed on both sides of the CLC layer 23, the CLC layer 23 is in the transmissive state.

When a DC voltage is applied to between the first electrode 22 and the second electrode 24, under the action of a DC electric field, the chiral ionic liquid in the CLC layer 23 is respectively migrated towards the first electrode 22 and the second electrode 24 (negative ions are migrated to the positive electrode and positive ions are migrated to the negative electrode), and hence the negative liquid crystal molecules can form a focal conic texture, and consequently the CLC layer 23 is in the light-scattering state. Moreover, when different DC voltages are applied between the first electrode 22 and the second electrode 24, the transmittance of the CLC layer 23 is different. When the applied DC voltage is higher, the CLC layer 23 tends to be in the light-scattering state and hence the transmittance is lower. When the applied DC voltage is lower, the CLC layer 23 tends to be in the transparent state and hence the transmittance is higher. Therefore, the transmittance of the CLC layer 23 can be adjusted by the adjustment of the DC voltage applied between the first electrode 22 and the second electrode 24.

After the DC voltage applied between the first electrode 22 and the second electrode 24 is stable, the DC voltage is switched into a high-frequency AC voltage, so that the focal conic texture of the negative liquid crystal molecules can be converted into the planar texture under the action of the high-frequency AC voltage. Moreover, near the positive electrode the chiral ionic liquid with negative charges has high concentration and high helical twisting force, so that the thread pitch near the positive electrode can be greatly decreased; and near the negative electrode the chiral ionic liquid with positive charges has low concentration and low helical twisting force, so that the thread pitch near the negative electrode can be slightly increased. Therefore, the graded distribution of the thread pitch in the direction perpendicular to the first substrate and the second substrate can be achieved, and hence the CLC layer 23 is in the transflective state. After the high-frequency AC voltage is not removed from between the first electrode 22 and the second electrode 24 for a period of time or a reverse DC voltage is applied, the CLC layer 23 can restore the transmissive state.

For instance, the LCD panel 1 is of a normally white mode. When no voltage is applied to the display panel in the normally white mode, an effective display area of the display panel corresponding to liquid crystal molecules is light-transmissive; and when a voltage is applied, the effective display area of the display panel corresponding to the liquid crystal molecules is light-tight. As the display device of the embodiment is in the transparent state or the display state with a transparent background most of the time when applied for a refrigerator window, the LCD panel in the normally white mode is more power-saving.

For instance, when the LCD panel 1 is of the TN type, the LCD panel 1 includes an array substrate, a color filter substrate and a nematic liquid crystal layer disposed between the array substrate and the color filter substrate. Both the structure and the material of the array substrate and the color filter substrate can be prepared according to the conventional technology in the art and will not be further described herein.

For instance, the light sources 3 may employ LEDs or EL sheets, or alternatively, may employ cold cathode fluorescence lamps and the like.

The air layer 4 has the function of further improving light utilization efficiency. The light includes the light emitted by the light sources as well as ambient light (e.g., sunlight). The thickness of the air layer 4 may be automatically adjusted by those skilled in the art according to actual conditions.

Other structures and functions of the embodiment are the same with those of the embodiment 2 and will not be further described herein.

The foregoing is only the preferred embodiments of the present invention and not intended to limit the scope of protection of the present invention. The scope of protection of the present invention should be defined by the appended claims.

The invention claimed is:

1. A display device comprising:
a display panel and a background panel arranged opposite to each other, and
a light source disposed on a peripheral side surface of the background panel,
wherein the background panel is in a transmissive state where no voltage is applied thereto, is in a light-scattering state where a direct-current (DC) voltage is applied thereto, and is in a transflective state where a high-frequency alternating-current (AC) voltage is applied thereto.

2. The display device according to claim 1, wherein transmittance of the background panel is different where different DC voltages are applied to the background panel.

3. The display device according to claim 2, wherein transmittance of the background panel is lower where the DC voltage applied to the background panel is higher.

4. The display device according to claim 2, wherein the background panel includes a first substrate and a second substrate arranged opposite to each other, a cholesteric liquid crystal (CLC) layer disposed between the first substrate and the second substrate, a first electrode disposed between the first substrate and the CLC layer, and a second electrode disposed between the second substrate and the CLC layer.

5. The display device according to claim 4, wherein the CLC layer employs a negative liquid crystal layer comprising chiral ionic liquid.

6. The display device according to claim 5, wherein the chiral ionic liquid comprises imidazolium chiral ionic liquid, quaternary ammonium chiral ionic liquid, oxazolinium chiral ionic liquid, thiazolinium chiral ionic liquid, or pyridinium chiral ionic liquid.

7. The display device according to claim 4, wherein the first substrate and the second substrate employ transparent alkali-free glass substrates or quartz substrates; and the first electrode and the second electrode are made of indium tin oxide (ITO) films or indium zinc oxide (IZO) films.

8. The display device according to claim 1, wherein the background panel includes a first substrate and a second substrate arranged opposite to each other, a cholesteric liquid crystal (CLC) layer disposed between the first substrate and the second substrate, a first electrode disposed between the first substrate and the CLC layer, and a second electrode disposed between the second substrate and the CLC layer.

9. The display device according to claim 8, wherein the CLC layer employs a negative liquid crystal layer comprising chiral ionic liquid.

10. The display device according to claim 9, wherein the chiral ionic liquid comprises imidazolium chiral ionic liquid, quaternary ammonium chiral ionic liquid, oxazolinium chiral ionic liquid, thiazolinium chiral ionic liquid, or pyridinium chiral ionic liquid.

11. The display device according to claim 8, wherein the first substrate and the second substrate employ transparent alkali-free glass substrates or quartz substrates; and the first electrode and the second electrode are made of indium tin oxide (ITO) films or indium zinc oxide (IZO) films.

12. The display device according to claim 8, wherein the display panel is of a normally white (NW) mode.

13. The display device according to claim 8, wherein the display panel is a liquid crystal display (LCD) panel.

14. The display device according to claim 8, further comprising an air layer disposed between the display panel and the background panel.

15. The display device according to claim 8, wherein the light source is a light-emitting diode (LED) or an electroluminescent (EL) sheet.

16. The display device according to claim 1, wherein the display panel is of a normally white (NW) mode.

17. The display device according to claim 1, wherein the display panel is a liquid crystal display (LCD) panel.

18. The display device according to claim 1, further comprising an air layer disposed between the display panel and the background panel.

19. The display device according to claim 1, wherein the light source is a light-emitting diode (LED) or an electroluminescent (EL) sheet.

* * * * *